United States Patent
Kobayashi

(10) Patent No.: US 7,728,850 B2
(45) Date of Patent: Jun. 1, 2010

(54) APPARATUS AND METHODS FOR PROCESSING LAYERED IMAGE DATA OF A DOCUMENT

(75) Inventor: Kunihiko Kobayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/212,883

(22) Filed: Aug. 29, 2005

(65) Prior Publication Data

US 2006/0203011 A1 Sep. 14, 2006

(30) Foreign Application Priority Data

Mar. 14, 2005 (JP) .............................. 2005-071386

(51) Int. Cl.
*G09G 5/00* (2006.01)
(52) U.S. Cl. ...................... 345/629; 345/620; 345/621; 345/624; 345/625; 345/627; 345/628; 345/630; 345/631; 345/634; 345/636
(58) Field of Classification Search ................. 345/620, 345/621, 624, 625, 627, 628, 629, 630, 631, 345/634, 636
See application file for complete search history.

(56) References Cited

U.S. PATENT DOCUMENTS

| | | | | | |
|---|---|---|---|---|---|
| 5,295,235 | A | * | 3/1994 | Newman | 345/619 |
| 5,420,966 | A | * | 5/1995 | Silverbrook | 345/422 |
| 5,627,959 | A | * | 5/1997 | Brown et al. | 715/853 |
| 5,995,116 | A | * | 11/1999 | Fujimura | 345/441 |
| 6,069,633 | A | * | 5/2000 | Apparao et al. | 345/421 |
| 6,236,410 | B1 | * | 5/2001 | Politis et al. | 345/440 |
| 6,753,863 | B1 | * | 6/2004 | Winkler et al. | 345/473 |
| 6,937,651 | B1 | * | 8/2005 | Brill et al. | 375/240 |
| 2002/0122036 | A1 | * | 9/2002 | Sasaki | 345/422 |
| 2002/0136460 | A1 | * | 9/2002 | Bottou et al. | 382/224 |
| 2003/0016221 | A1 | * | 1/2003 | Long et al. | 345/441 |
| 2004/0117735 | A1 | * | 6/2004 | Breen | 715/517 |
| 2004/0223168 | A1 | * | 11/2004 | Haneda et al. | 358/1.1 |
| 2005/0116963 | A1 | * | 6/2005 | Bourdev et al. | 345/619 |
| 2005/0180645 | A1 | * | 8/2005 | Hasegawa et al. | 382/239 |
| 2005/0240858 | A1 | * | 10/2005 | Croft et al. | 715/500 |
| 2006/0197764 | A1 | * | 9/2006 | Yang | 345/473 |
| 2007/0033234 | A1 | * | 2/2007 | Murakami et al. | 707/200 |

FOREIGN PATENT DOCUMENTS

| | | | |
|---|---|---|---|
| CN | 1501712 | | 6/2004 |
| JP | 11261833 A | * | 9/1999 |
| JP | A 2003-244447 | | 8/2003 |

OTHER PUBLICATIONS

Partial Translation of Chinese Office Action, Feb. 15, 2008.

* cited by examiner

*Primary Examiner*—Ulka Chauhan
*Assistant Examiner*—Jeffrey J Chow
(74) *Attorney, Agent, or Firm*—Oliff & Berridge, PLC

(57) ABSTRACT

An image processing apparatus has a classification unit and a layer image data generation unit. The classification unit classifies respective drawn elements into a plurality of element types. The layer image data generation unit generates layer image data which include the drawn elements of the respective element types and in which respective drawing order is regulated. The layer image data generation unit generates the layer image data based on the drawing order.

8 Claims, 11 Drawing Sheets

FIG. 5

| TYPE | FORM | APPLIED OBJECT VIEW |
|---|---|---|
| RECTANGLE | HEIGHT<br>START AND END POINT COORDINATE<br>`SX \| EX`<br>`H` | |
| STRAIGHT LINE | HEIGHT<br>START POINT COORDINATE<br>INCLINATION<br>`H`<br>`X`<br>`Slant` | |
| TRAPEZOID | HEIGHT<br>START POINT COORDINATE OF LEFT SIDE<br>INCLINATION OF LEFT SIDE<br>START POINT COORDINATE OF RIGHT SIDE<br>INCLINATION OF RIGHT SIDE<br>`H`<br>`SX`<br>`SSlant`<br>`EX`<br>`ESlant` | |
| ... | ... | ... |

RED :
  Y=2, X=3~4
  Y=3, X=3~4  } P

BLACK :
  Y=1, X=1~3
  Y=2, X=1~2
  Y=4, X=2~4
  Y=5, X=2~4  } Q

APPARATUS AND METHODS FOR PROCESSING LAYERED IMAGE DATA OF A DOCUMENT

BACKGROUND OF THE INVENTION (1) Field of the Invention

The present invention relates to an image processing apparatus for processing a document created by application software, an image processing method and a storage medium storing a program for causing image processing to be executed.

(2) Description of the Related Art

In recent years, people make an electronic document created by using a computer. Many kinds of applications are well known to make the electronic document. However, many of the documents created by such applications can be generally browsed and corrected only by the application used for the creation.

Therefore, rasterizing the document into a bitmap image makes it possible to be referred by a user who does not have the application used for creating the document. In this case, since the amount of data of the bitmap image is generally large, it is well known to reduce the amount of data by run-length compression for example.

Patent document 1 (JP-A-2003-244447) discloses a technique to improve compression efficiency of a picture portion. The technique teaches a method in which a character and a picture are separated and extracted from image data. Then a pixel value of the image data in which the character is removed from the picture portion is determined by a predetermined method.

Although this method improves the compression efficiency, it is not satisfied with quality of the compression to reuse the image data.

SUMMARY OF THE INVENTION

The present invention has been made in view of the above circumstances and provides an image processing apparatus to reuse an image of compressed image data.

According to an aspect of the invention, an image processing apparatus includes a unit that processes a document, as a processing object, including plural drawn elements having portions superimposed on each other to classify the respective drawn elements into plural previously determined element types, and a unit that creates plural layer image data which include the drawn elements of the respective element types and in which respective drawing order is regulated, and the unit that creates the layer image data selects, as a noted drawn element, a drawn element which is included in layer image data drawn later than a preceding drawn element included in layer image data drawn precedingly in the drawing order of the layer image data and at least a portion of which is concealed by the preceding drawn element in the document as the processing object, performs a specified processing on the concealed portion of the noted drawn element, and causes the noted drawn element after the specified processing to be included in the layer image data corresponding to the element type.

BRIEF DESCRIPTION OF THE DRAWINGS

Embodiments of the invention will be described in detail based on the following figures, wherein:

FIG. 5 is an explanatory view showing an example of a graphic expression form in intermediate code information;

DETAILED DESCRIPTION OF THE INVENTION

Figure 1:
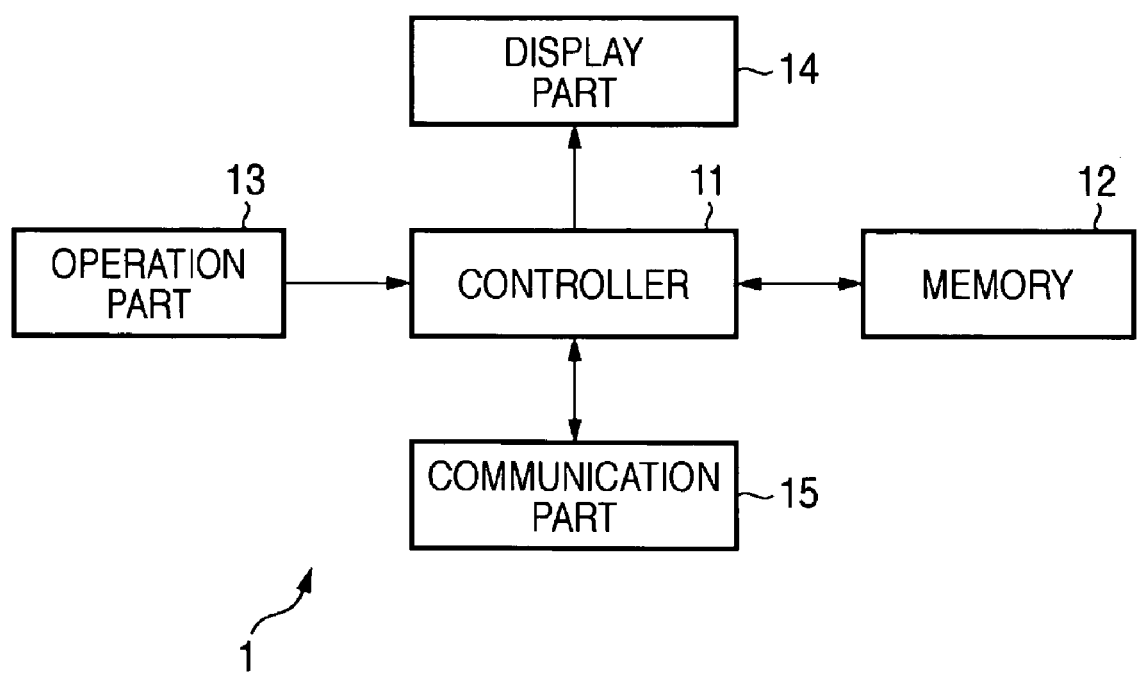
FIG. 1 is a structural block diagram showing an example of an image processing apparatus according to an embodiment of the invention.

An embodiment of the invention will be described with reference to the drawings. As shown in FIG. 1, an image processing apparatus 1 includes a controller 11, a memory 12, an operation part 13, a display part 14 and a communication part 15.

Figure 2:
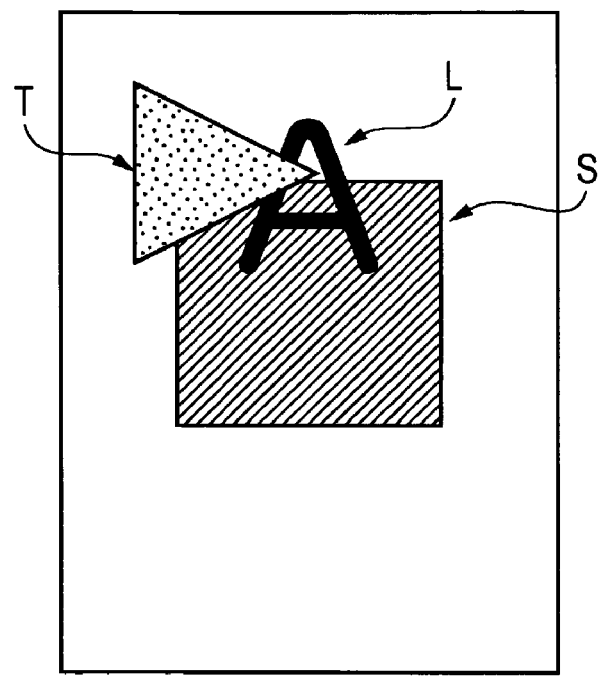
FIG. 2 is an explanatory view showing an example of data of a document as a processing object.
Figure 3:
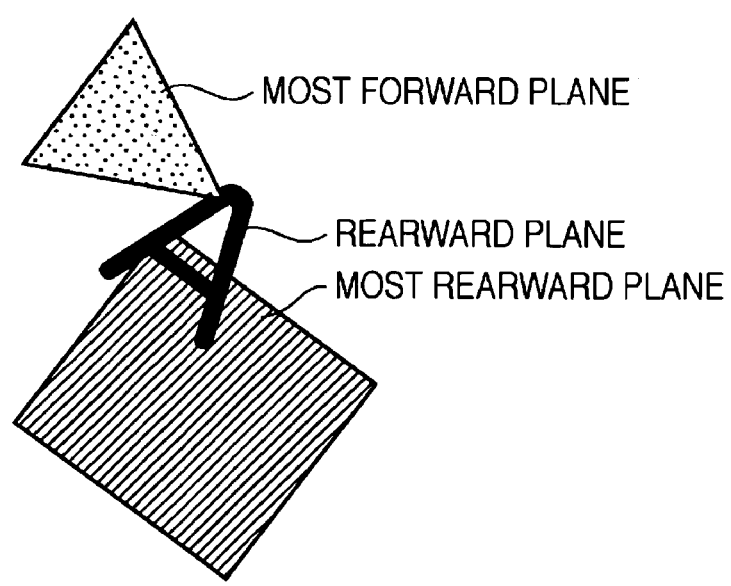
FIG. 3 is an explanatory view showing the outline of the data of the document as the processing object.

A document to be processed in the embodiment is created by a general word processor, layout software or the like. Specifically, this document includes plural drawn elements having portions superimposed on each other. For example, as shown in FIG. 2, a drawing is made such that a character object L of "A" is superimposed on a square graphic object S, and further, a triangular graphic object T is superimposed on this character object L. That is, as shown in FIG. 3, the square object is made the most rearward plane, the character object is drawn thereon, and further, the triangular object is drawn thereon as the most forward plane. The information of the shape of each object, including concealed portions, is held completely. In an application, it is general that the order of the superimposition (hereinafter referred to as original order), the range of the superimposition and the like can be adjusted.

The controller 11 is a CPU or the like, and operates in accordance with a program stored in the memory 12. In this embodiment, this controller 11 classifies drawn elements, such as character images and graphic images, and creates layer image data of each image type. Here, it is assumed that the drawing order is regulated in each of the layer image data. For example, in the case where a picture is first drawn, and a character is drawn later, the layer image data of the picture is first drawn, and next, the layer image data of the character is superimposed and drawn. The specific processing of the controller 11 will be described later in detail.

The memory 12 includes storage elements such as a RAM and a ROM. This memory 12 stores a program to be executed by the controller 11. This memory 12 may operate as a work memory of the controller 11.

The operation part 13 is a keyboard or a mouse, and outputs the content of an instruction inputted by a user to the controller 11. The display part 14 is a display or the like, and displays information in accordance with the instruction inputted from the controller 11. The communication part 15 is a network interface or the like, and transmits information to an instructed destination in accordance with the instruction inputted from the controller 11. This communication part 15 receives information coming through a network, and outputs it to the controller 11.

Figure 4:
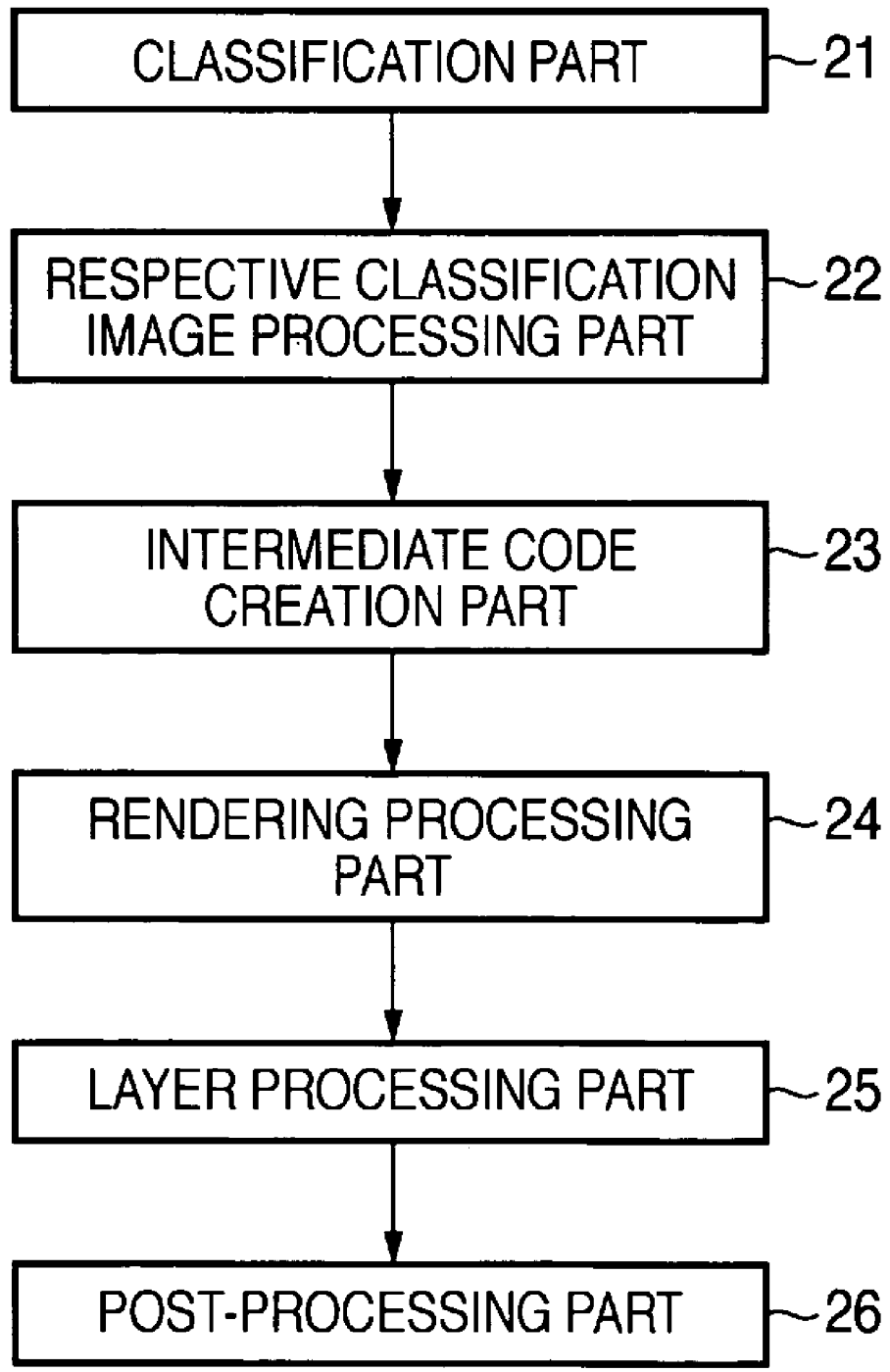
FIG. 4 is a functional block diagram of an image processing apparatus according to an embodiment of the invention.

Here, the operation of the controller 11 will be described. The image processing apparatus realized by the operation of the controller 11 functionally includes, as shown in FIG. 4, a classification part 21, a respective classification image processing part 22, an intermediate code creation part 23, a rendering processing part 24, a layer processing part 25, and a post-processing part 26.

The classification part 21 classifies elements in image data of a document. Here, it is assumed that a classification is made into element types of a character, a picture (graphic form) and a photograph. This classification can be performed based on the data structure of the document. Generally, each of the drawn elements have information relating to the element type. The classification part 21 refers to the information, and executes the classification of the respective drawn elements.

The respective classification image processing part 22 executes a specified processing (processing previously determined for each classification, for example, adjustment of contrast for the photograph) on each of the drawn elements after the classification.

The intermediate code creation part 23 creates intermediate code information to cause a rendering processing to be simply performed based on the information of the drawn elements outputted by the respective classification image processing part 22.

First, as shown in FIG. 5, the intermediate code creation part 23 creates information (basic information). The information (basic information) expresses the shape of each of the drawn elements by start and end point of the X coordinate (scanning direction) and the height without using the Y coordinate (sub-scanning direction). For example, when the shape is a rectangle, it can be expressed by a height H, a start point coordinate (SX) in the X coordinate direction, and an end point coordinate (EX). When a shape having an inclination, such as a straight line or a trapezoid, is expressed, the basic information has information expressing the magnitude of the inclination.

Figure 6:
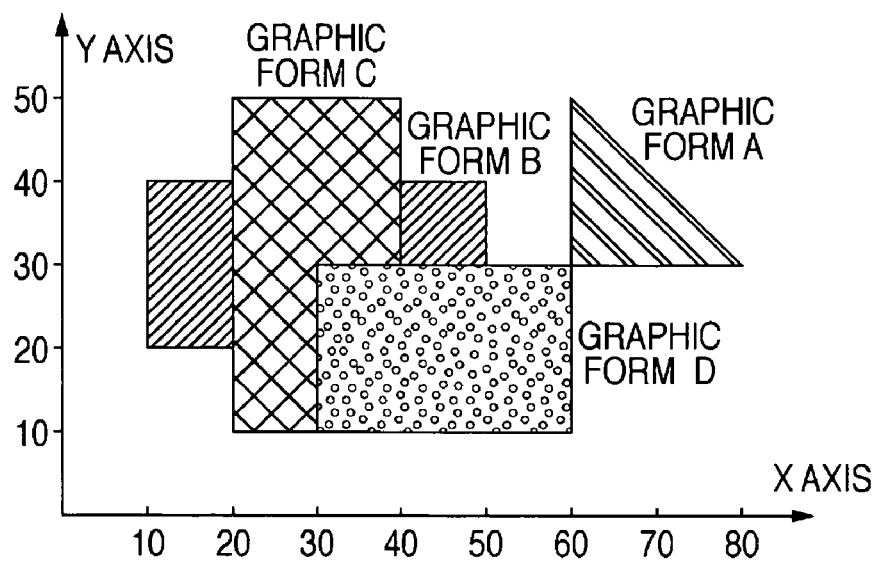
FIG. 6 is an explanatory view showing another example of data of a document as a processing object.

Y coordinate values of each of the drawn elements are included in the intermediate code information in a manner described below. The intermediate code creation part 23 detects a drawing start point of each of the drawn elements. The drawing start point is a value of the Y coordinate where a noted drawn element first appears when scanning is made one line by one line in order from the maximum value in the Y coordinate. For example, as shown in FIG. 6, it is assumed that graphic forms A to D are drawn in this order (that is, a graphic form A is drawn on the most rearward plane; B, on a forward plane thereof; C, on a further forward plane thereof; and D, on the most forward plane). Here, the drawing start points of the graphic forms A and C are "50", the drawing start point of the graphic form B is "40", and the drawing start point of the graphic form D is "30".

The intermediate code creation part 23 next creates information in which a drawn element is correlated with each value of the drawing start points. For example, in the case of the example shown in FIG. 6, the Y coordinate value "50" is correlated with the information to specify the graphic form A and the graphic form C. The Y coordinate value "40" is correlated with the information to specify the graphic form B. Here, in the case where plural drawn elements are correlated with the same value, the intermediate code creation part 23 links and correlates information to specify the respective graphic elements in ascending order of drawing (one drawn on a more forward plane precedes). That is, in the example shown in FIG. 6, the Y coordinate value "50" is first correlated with the information to specify the graphic form C, and is next correlated with the information to specify the graphic form A. Here, the information to specify each graphic form (drawn element) may be the basic information (information including the height and the start and end point coordinates in the X coordinate). The intermediate code creation part 23 outputs, as the intermediate code, a group of information in which the basic information is linked to the Y coordinate value.

Figure 7:
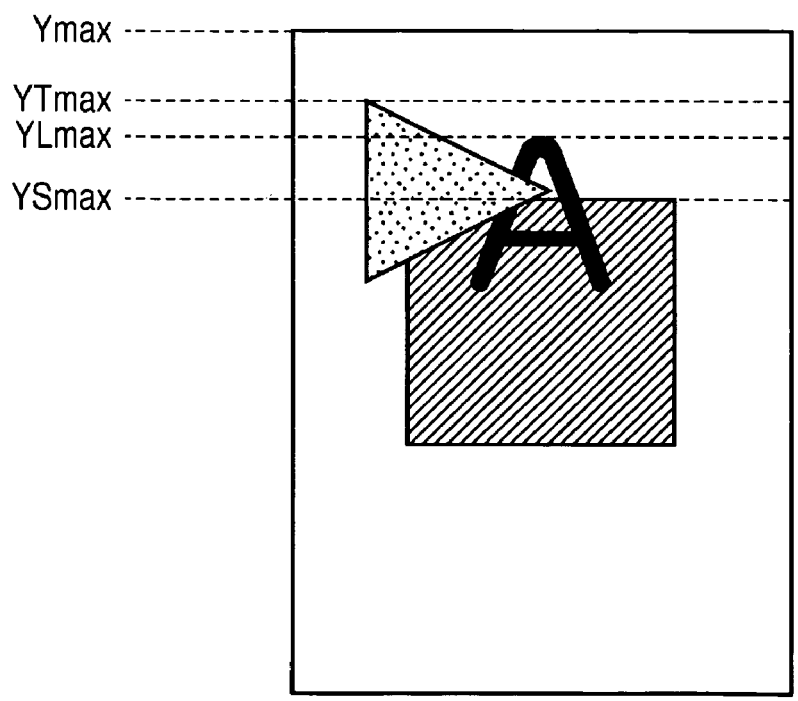
FIG. 7 is an explanatory view showing coordinate values in data of a document as a processing object.

The rendering processing part 24 renders the respective drawn elements one line by one line from the maximum value Ymax of the Y coordinate. That is, rendering results for each line are outputted. Here, a description will be made while using a document of FIG. 7 corresponding to FIG. 2 as an example. Incidentally, as shown in FIG. 7, it is assumed that the drawing start point of a square object is YSmax, the drawing start point of a character object is YLmax, and the drawing start point of a triangular object is YTmax.

The rendering processing part 24 scans the intermediate code information one line by one line (while decrementing the Y coordinate value by "1") from Ymax, and finds the basic information to indicate the triangular object at the coordinate of YTmax. Then, from the basic information, the start X coordinate and the end X coordinate where the triangular object is to be drawn on the line are determined, and information (Y coordinate value) to specify the line, information of color of the triangular object, information of the element type of the triangular object, and information of the drawing start X coordinate and Y coordinate are outputted as edge information. The rendering processing part 24 outputs the edge information concerning each graphic element for each line in this way. For example, on the line at the coordinate of YSmax of FIG. 7, the square object, the character object and the triangular object are superimposed on one another. The rendering processing part 24 creates the edge information concerning the square object and including the coordinate information of from the start point of the square object to the end point, the edge information of the character object, and the edge information of the triangular object individually, and stores them in the memory 12.

Next, before the specific content of the rendering processing is described, for facilitating a subsequent description, a processing (hereinafter referred to as a basic processing) to output, as a flat image without hierarchy, each image element ordered in drawing order will be described.

In this basic processing, edge information of each layer is created from edge information of each graphic element. For example, in the case where a separation is made into three layers of a character, a picture and a photograph, edge information of each of the layers is created.

Figure 8:
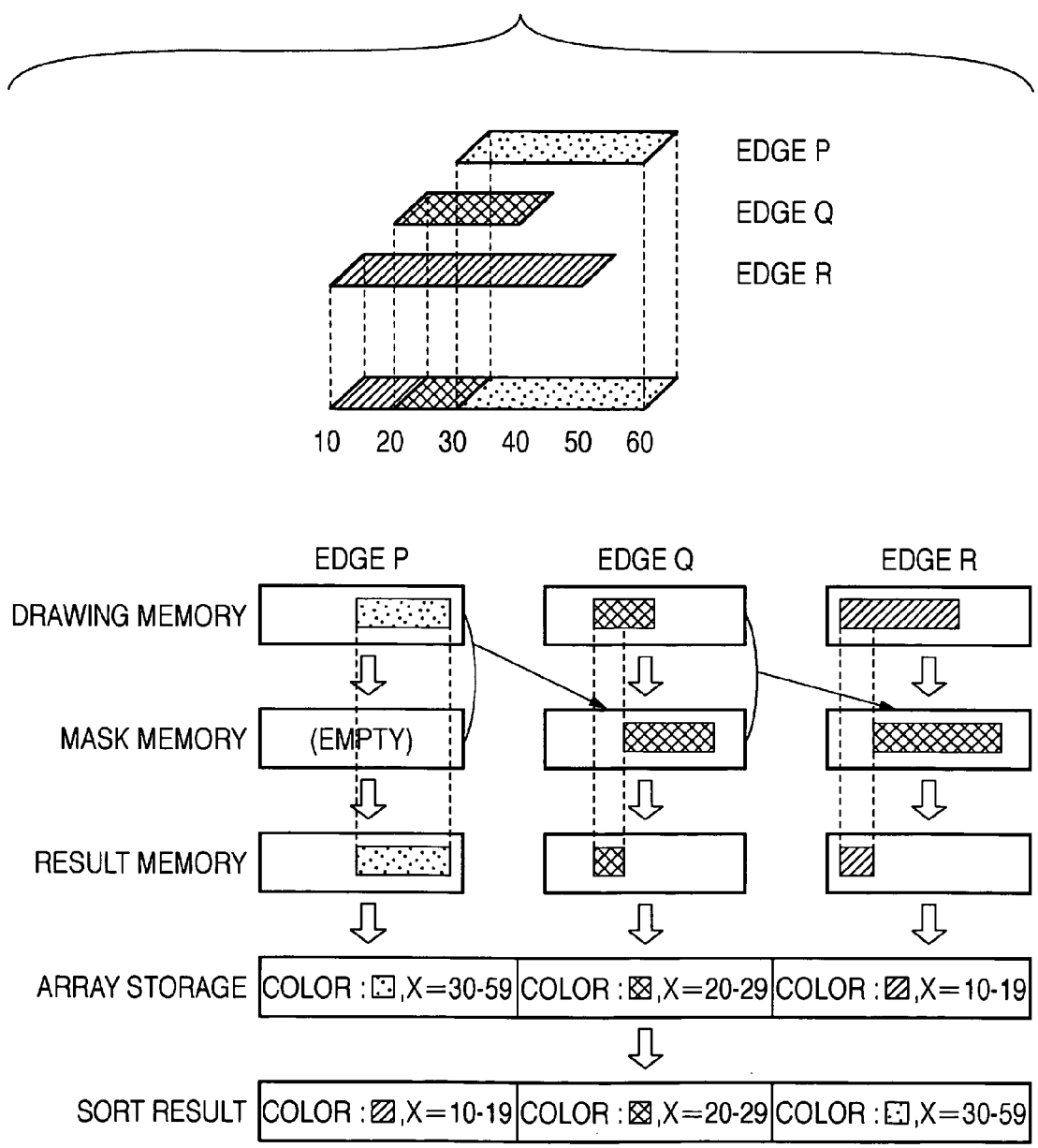
FIG. 8 is an explanatory view showing a processing example of edge information.

First, with respect to graphic elements which are to belong to the same layer (graphic elements classified into the same element type), a processing is made as described below. For example, on a certain line, as shown in FIG. 8, a description will be made while a case where three edge informations P, Q and R relating to graphic elements of the same element type are superimposed on one another is used as an example.

In the basic processing, based on the information (which may be acquired by referring to the intermediate code information, or the information of the drawing order included in the data of the document may be referred) of the drawing order of the respective graphic elements on the line and edge information, first, with respect to the edge information (P in FIG. 8) relating to the graphic element to be drawn on the most forward plane, a drawing memory for one line to store a drawing result based on the edge information, a mask memory for one line to store a mask edge to specify at least a portion of the edge, the portion to be removed, and a result memory for one line to store a processing result are secured in the memory. Then, the mask edge is initialized to be empty.

In the basic processing, based on the edge information P, a drawing processing is performed in the drawing memory. Next, a processing to remove the content (here, empty) stored in the mask memory from the drawing result in the drawing memory is performed, and the result of the processing is stored in the result memory.

Next, a processing concerning the edge information Q superimposed on the edge information P is performed. Also in this case, a drawing memory for one line to store a drawing result based on the edge information, a mask memory for one line to store a mask edge to specify at least a portion of the edge, the portion to be removed, and a result memory for one line to store a processing result are secured in the memory. At this time, the logical sum operation result of the information in the preceding stage drawing memory and the information in the preceding stage mask memory is stored in the mask memory. Here, since the preceding stage mask memory is empty, mask edge (information of start and end coordinates equal to the edge information P and having no color information) corresponding to the information in the preceding stage drawing memory is created and is stored in the mask memory.

Next, based on the edge information Q, a drawing processing is performed in the drawing memory. Further, a processing to remove the content stored in the mask memory from the drawing result in the drawing memory is performed, and the result of the processing is stored in the result memory. Here, the content means information to specify the portion to be concealed by the edge information P.

The edge information R is also similarly processed. In this case, information to specify a portion to be concealed by one of the edge information P and the edge information Q is stored in the mask memory. Then, the content stored in the mask memory is removed from the image drawn by the edge information R, and the result of the processing is created.

Further, processing result information to correlate the information to express the color of the graphic element included in each edge information with the information to specify the start coordinate and end coordinate of the edge stored in each result memory is created. Here, with respect to the edge information P, the coordinate information of the processing result is from "30" to "59", with respect to the edge information Q, it is from "20" to "29", and with respect to the edge information R, it is from "10" to "19". The information of this processing results becomes information as indicated in an "array storage" column of FIG. 8.

Besides, the information of this "array storage" column is rearranged, information as indicated in a "sort result" column is created, and an edge information group in which a link is made in this sort order is created.

In the basic processing, with respect to the edge information classified into the respective element types of the character, picture and photograph, the above processing is carried out. And next, a processing is carried out with respect to the edge information classified into a different element type.

Figure 9:
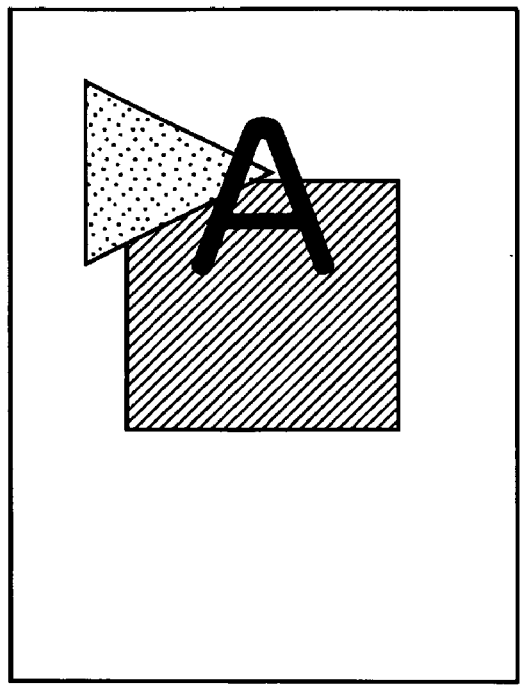
FIG. 9 is an explanatory view showing an example in which layer image data are combined as they are.
Figure 14A:
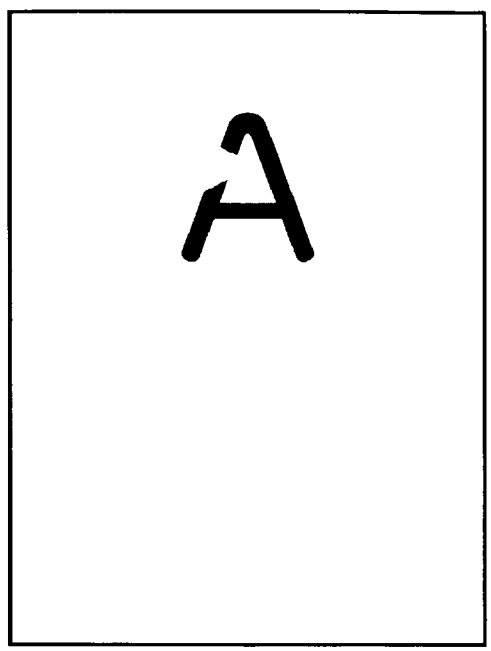
FIGS. 14A and 14B are explanatory views showing an example of a case where the output is made as flat images.
Figure 14B:
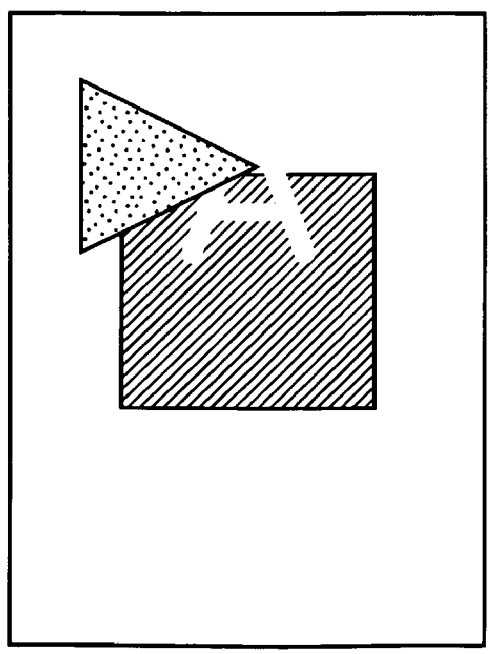

Here, as already described, the drawing order is regulated for each of the layer image data as the classification results of the respective element types. For example, the layer image data of the picture is first drawn, and the layer image data of the character is drawn thereon. In accordance with this classification, with respect to the example shown in FIG. 7, when two classification image data are created from flat images having no hierarchy, they become as shown in FIGS. 14A and 14B. As a result, the image of the picture (graphic form) portion (FIG. 14B) becomes an image in which a character portion is removed. On the other hand, the respective graphic elements as schematically shown in FIG. 3 are separated into the layer of the picture and the layer of the character, and in case the layer of the picture is drawn first, and the layer of the character is drawn later, the state as shown in FIG. 9 occurs, the drawing order of the character object and the triangular object is changed, and the original document is not reproduced.

The rendering processing part 24 of this embodiment selects, as a noted drawn element, a drawn element which is included in layer image data drawn later than a preceding drawn element included in layer image data drawn precedingly in drawing order of the layer image data, and at least a portion of which is concealed by the preceding drawn element in data of a document, performs a specified processing on the concealed portion of the noted drawn element, and causes the noted drawn element after the specified processing to be included in the layer image data corresponding to the element type.

That is, with respect to the drawn element which is drawn in the drawing order different from the drawing order on the data of the document, the processing to remove the portion concealed on the data of the document is performed based on the drawing order of the layer image data. Since this processing need not be performed with respect to the drawn element included in the first drawn layer image data, the rendering processing part 24 does not perform this processing on the edge information included in the layer image data which becomes the most rearward plane.

The rendering processing part 24 sequentially selects layer image data drawn in a lower layer (layer image data drawn more precedingly) as the noted layer image data. With respect to the edge information to be included in the noted layer image data, a processing is performed as described below.

That is, with respect to the layer image data which is not the most rearward plane, the rendering processing part 24 selects the edge information of the drawn element included in the layer image data as the noted edge information, and secures, with respect to this noted edge information, a drawing memory for one line to store a drawing result based on the edge information, a mask memory for one line to store a mask edge to specify at least a portion of the edge, the portion to be removed, and a result memory for one line to store a processing result in the memory 12. At this time, among drawn elements to be drawn in lower layers (precedingly), edge information of the drawn element drawn later than the noted drawn element on the data of the document (in the case where there are plural ones, the logical sum thereof) is stored into the mask memory.

Then, based on the noted edge information, the rendering processing part 24 performs a drawing processing in the drawing memory. Next, the rendering processing part 24 performs a processing to remove the content stored in the mask memory from the drawing result in the drawing memory, and stores the result of the processing into the result memory.

Figure 10A:
FIGS. 10A to 10E are explanatory views showing processing examples for edge information.
Figure 10B:
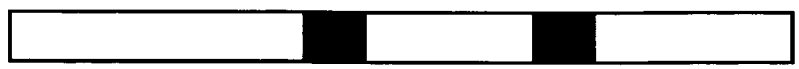

As a specific processing example, a processing on the line at the coordinate of YSmax of FIG. 7 will be described. On the line, the character object is drawn on the square object, and the triangular object is further drawn thereon. On this line, the edge information relating to the picture layer image data becomes as shown in FIG. 10A, and the edge information relating to the character layer image data becomes as shown in FIG. 10B. Besides, in the following description, it is assumed that the drawing order of the layer image data is such that the layer image data of the picture (graphic form) is earlier, and the layer image data of the character is later.

Figure 10C:

In this case, the rendering processing part 24 draws the edge information (FIG. 10B) corresponding to the layer image data of the character, and then, stores an image corresponding to the edge portion (left portion of FIG. 10A) corresponding to the drawn element to be included in the picture layer image data into the mask memory (FIG. 10C).

Figure 10D:
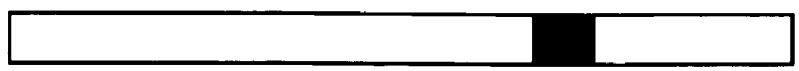

The rendering processing part 24 removes a portion superimposed on the image stored in the mask memory from the edge information of the character layer image data (FIG. 10D). That is, the portion to be concealed is removed. Incidentally, among images expressed by the edge information of the character layer image data, when the color of the portion superimposed on the image stored in the mask memory is determined based on the color of the drawn element at the concealing side and the color of the drawn element at the concealed side, a semitransparent combined state can be realized.

With respect to the edge information after the above processing, the rendering processing part 24 further creates processing result information to correlate the information expressing the color of the graphic element included in the edge information with the information to specify the start coordinate and end coordinate of the edge stored in the result memory. Further, the rendering processing part 24 creates information in which this processing result information is rearranged in the descending order of X coordinate values, and creates an edge information group in which a link is made in this sort order.

Figure 10E:
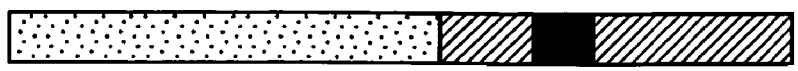

Therefore, when the character layer image data shown in FIG. 10D is superimposed on the picture layer image data as shown in FIG. 10A, the image shown in FIG. 10E is obtained. That is, the image corresponding to the data of the original document can be reproduced.

The rendering processing part 24 outputs the edge information group for each layer created as stated above.

The layer processing part 25 outputs the edge information group for each layer to the post-processing part 26 and causes it to perform the post-processing, and the edge information group for each layer after the post-processing is outputted.

The post-processing part 26 performs, for example, a compression processing on the edge information group for each layer inputted from the layer processing part 25 and makes an output. Here, the compression processing may be made processing different for each layer. Here, since the edge information is such that the X coordinate as the start point of a significant pixel and the X coordinate as the end point are determined for each line, it is easy to calculate the run-length. Then, the run-length compression may be performed based on such edge information.

Figures 11A, 11B:
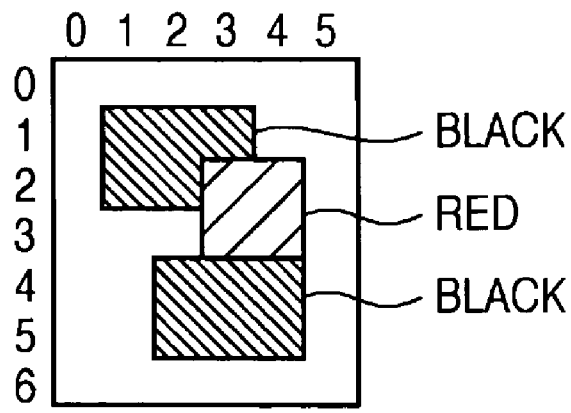
FIGS. 11A and 11B are explanatory views showing an example of edge information in certain layer image data.

Further, the result of the run-length compression may be outputted for each color information included in the edge information. For example, picture layer image data as shown in FIG. 11A is divided into edge information (P) correlated with information expressing red, and an edge information group (Q) correlated with information expressing black, and they are respectively subjected to the run-length compression (FIG. 11B).

Figure 12:
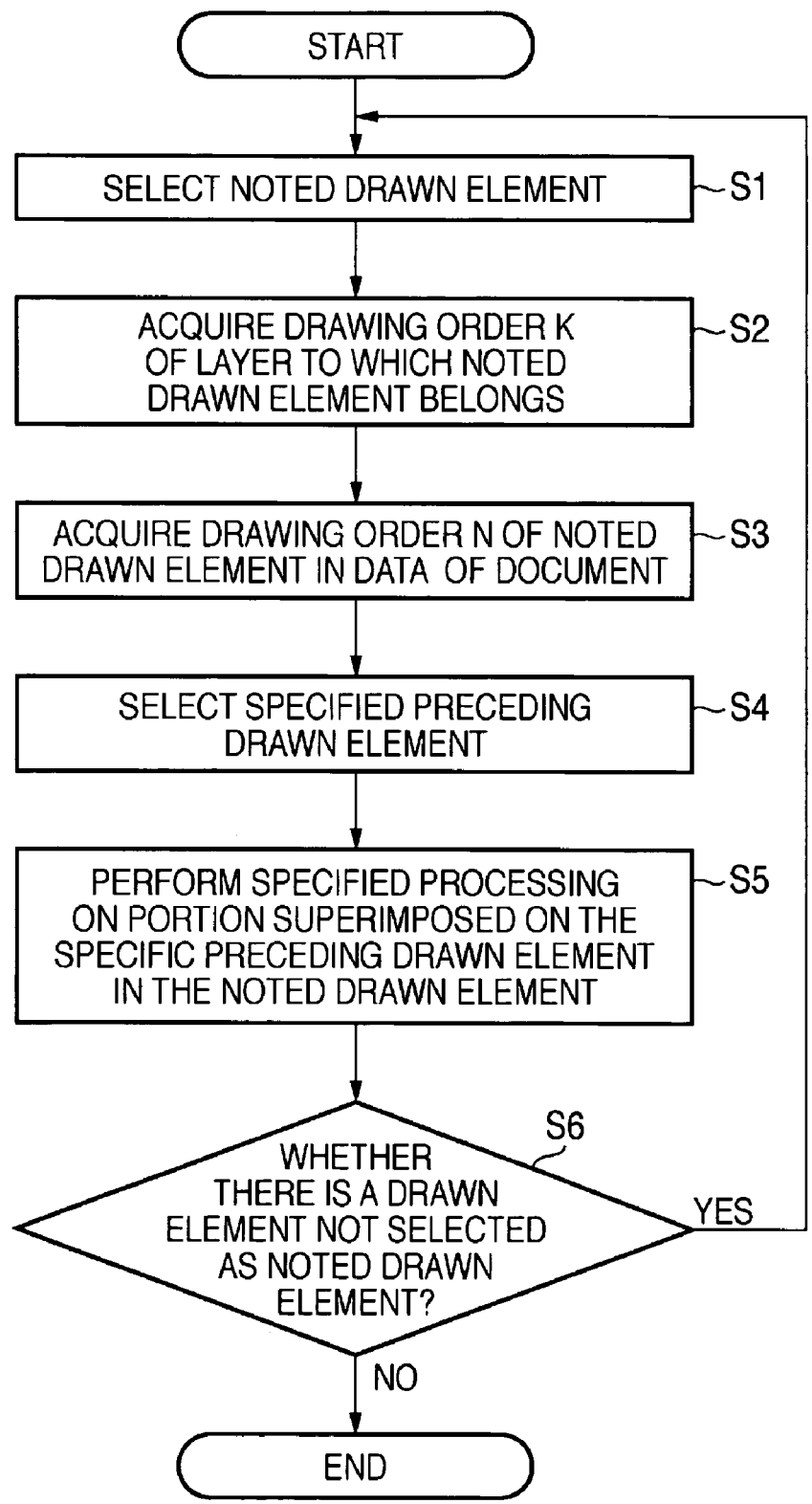
FIG. 12 is a flowchart showing another example of a processing in an image processing apparatus according to an embodiment of the invention.

In the description up to now, although the example in which the processing is performed using the edge information has been described, this embodiment is not limited to the example using the edge information. That is, with respect to the respective drawn elements, a processing as shown in FIG. 12 may be executed.

In this case, the controller 11 classifies drawn elements by respective element types, and selects one (which has not yet been selected) of them as a noted drawn element (S1). Reference is made to the classification result of the noted drawn element (it belongs to which element type), and a drawing order K of layer image data corresponding to the classification result is acquired (S2). Besides, a drawing order N of the noted drawn element in the data of the document is acquired (S3). Here, it is assumed that the drawing order is denoted by numbers such as 1, 2 . . . in order from a precedingly drawn element (one drawn on the most rearward plane).

The controller 11 selects, among drawn elements different from the noted drawn element, a drawn element in which a drawing order K' is K'<K according to the classification result and a drawing order N' in the data of the document is N'>N, as a specific preceding drawn element (S4).

The controller 11 performs a specified processing on a portion, in the noted drawn element, superimposed on the specific preceding drawn element (S5). Here, the specified processing may be the processing to remove the portion, or may be the processing to change the color of the portion based on the color of the specific preceding drawn element superimposed on the portion (processing to make it the color of a semitransparent composite result).

The controller 11 checks whether there is a drawn element which has not yet been selected as the noted drawn element (S6). When there is such a drawn element, return is made to the process S1, and the processing is continued. Besides, at process S6, when there is no drawn element which has not yet been selected as the noted drawn element, the processing is ended.

The controller 11 outputs the result of the drawing of the drawn element for each element type as the layer image data of each element type.

Figure 13A:
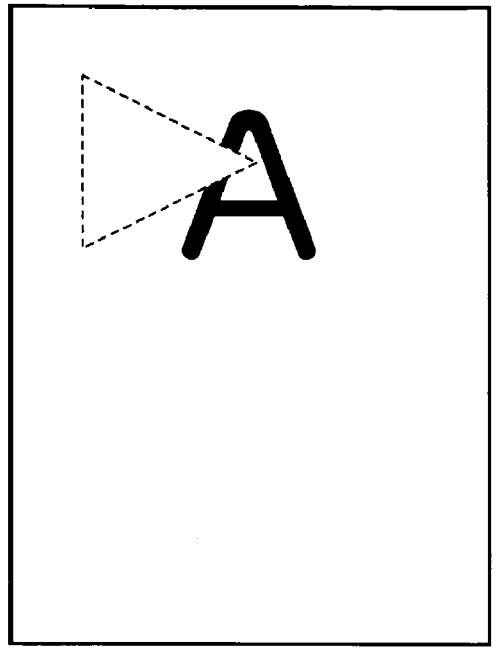
FIGS. 13A and 13B are explanatory views showing an example of layer image data to be created.
Figure 13B:
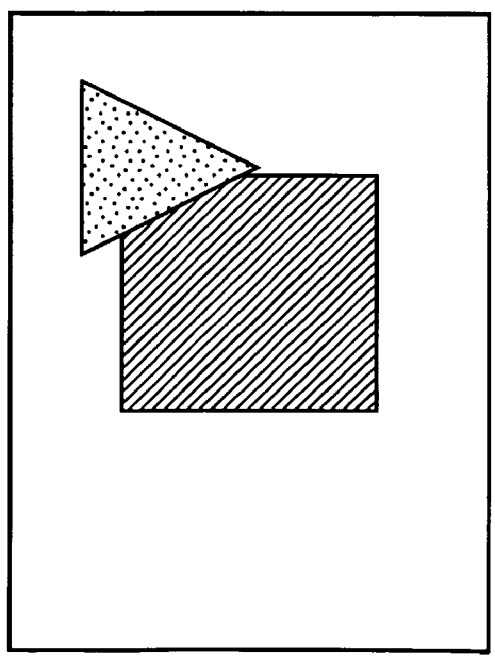

According to this processing, for example, with respect to the image of the document shown in FIG. 7, the character layer image data as shown in FIG. 13A and the picture layer image data as shown in FIG. 13B are created. Incidentally, in the example of FIGS. 13A and 13B, it is assumed that the drawing order of the picture layer image data is "1", and the drawing order of the character layer image data is "2". Besides, in FIG. 13A, in order to make the removed portion plain, the removed graphic portion in the drawn element corresponding to the character object is indicated by a broken line. This graphic portion corresponds to the drawn element portion corresponding to the triangular object.

By this, in the layer image data of each element type such as a character or picture, it is possible to create the image data in which the image of data of the original document can be reproduced by superimposing them in the regulated order concerning the layer image data and by drawing them. Besides, in this layer image data, for example, in the picture layer image data, it is possible to reproduce the picture which is included in the layer to be drawn prior to that and in which the portion to be concealed by the drawn element to be drawn later in the data of the original document is removed. That is, in the image data after conversion to the state suitable for compression, the reusability of the image included in the image data can be improved.

At the apparatus side to reproduce the image receiving the layer image data group as stated above, the respective layer image data are superimposed in the drawing order determined for each of them and are drawn. By this, the image at the time when the data of the original document is displayed is reproduced.

As described above, some embodiments of the invention are outlined below.

According to an aspect of the invention, an image processing apparatus includes a unit that processes a document, as a processing object, including plural drawn elements having portions superimposed on each other to classify the respective drawn elements into previously determined plural element types, and a unit that creates plural layer image data which include the drawn elements of the respective element types and in which respective drawing order is regulated, and the unit that creates the layer image data selects, as a noted drawn element, a drawn element which is included in layer image data drawn later than a preceding drawn element included in layer image data drawn precedingly in the drawing order of the layer image data, and at least a portion of which is concealed by the preceding drawn element in the document as the processing object, performs a specified processing on the concealed portion of the noted drawn element, and causes the noted drawn element after the specified processing to be included in the layer image data corresponding to the element type.

In the image processing apparatus, a processing to partially delete the concealed portion of the noted drawn element may be performed as the specified processing on the concealed portion of the noted drawn element.

According to another aspect of the invention, in an image processing method in which a document including plural drawn elements having portions superimposed on each other is made a processing object, the respective drawn elements are classified into previously determined plural element types, and plural layer image data are created which include the drawn elements of the respective element types and in which respective drawing order is regulated, at the time of the creation of the layer image data a drawn element which is included in layer image data drawn later than a preceding drawn element included in layer image data drawn precedingly in the drawing order of the layer image data, and at least a portion of which is concealed by the preceding drawn element in the document as the processing object is made a noted drawn element, a specified processing is performed on the concealed portion of the noted drawn element, and the noted drawn element after the specified processing is included in the layer image data corresponding to the element type.

According to another aspect of the invention, a storage medium readable by a computer, the storage medium storing a program of instructions executable by the computer to perform a function for causing an image processing to be executed, the function comprising: processing a document, as a processing object, including plural drawn elements having portions superimposed on each other to classify the respective drawn elements into previously determined plural element types, creating plural layer image data which include the drawn elements of the respective element types and in which respective drawing order is regulated, selecting, as a noted drawn element, a drawn element which is included in layer image data drawn later than a preceding drawn element included in layer image data drawn precedingly in the drawing order of the layer image data, and at least a portion of which is concealed by the preceding drawn element in the document as the processing object, performing a specified processing on the concealed portion of the noted drawn element, and causing the noted drawn element after the specified processing to be included in the layer image data corresponding to the element type.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-071386 filed on Mar. 14, 2005 including specification, claims, drawings and abstract is incorporated herein by reference in its entirety.

What is claimed is:

1. An image processing apparatus comprising:
a controller for processing image data of a document including a plurality of drawn elements, the plurality of drawn elements having portions where upper drawn elements are superimposed over lower drawn elements such that the lower drawn elements have concealed portions, the controller comprising a classification unit and a layer image data generation unit;
the classification unit classifying of drawn elements into a respective one of a plurality of element types, the plurality of element types comprising a first element type and a second element type, the first element type and the second element type being different element types,
wherein one of the elements types is a character type; and
the layer image data generation unit
generating a plurality of layer image data that include the drawn elements as classified by the classification unit, the plurality of layer image data including a first layer image data and a second layer image data,
wherein the first layer image data includes drawn elements of the first element type and the second layer image data includes drawn elements of the second element type;
determining the superimposed portions of lower drawn elements of the first layer image data concealed by portions of upper drawn elements of the second layer image data and deleting the concealed portions of the first layer image data;
determining the superimposed portions of lower drawn elements of the second layer image data concealed by portions of upper drawn elements of the first layer image data and deleting the concealed portions of the second layer image data; and
outputting edge information for the each layer image data.

2. The image processing apparatus according to claim 1, wherein the element types are a character, a picture, a graphic form and a photograph.

3. The image processing apparatus according to claim 1, wherein the layer image data generation unit reproduces an original document image by superimposing the plurality of data layers in a regulated order based on respective drawing orders determined for each of the plurality of data layers, the reproduced original document image retaining superimposed portions of the plurality of data layers.

4. The image processing apparatus according to claim 1, the layer image data generation unit creating intermediate code information that includes basic information expressing a shape of each drawn element;

linking the basic information to a maximum coordinate value for each drawn element in a sub-scanning direction, the basic information including, for each drawn element, a start point and an end point in a scanning direction;

rendering each drawn element on a line-by-line basis from the maximum coordinate value in the sub-scanning direction; and performing a compression processing on the edge information.

5. An image processing method comprising:

receiving with a controller image data of a document including a plurality of drawn elements, the plurality of drawn elements having portions where upper drawn elements are superimposed over lower drawn elements such that the lower drawn elements have concealed portions;

classifying with the controller drawn elements into a respective one of the plurality of element types, the plurality of element types comprising a first element type and a second element type, the first element type and the second element type being different element types, wherein one of the elements types is a character type; and generating with the controller a plurality of layer image data that include the drawn elements that have been classified, the plurality of layer image data including a first layer image data and a second layer image data, wherein the first layer image data includes drawn elements of the first element type and the second layer image data includes drawn elements of the second element type;

determining with the controller the superimposed portions of lower drawn elements of the first layer image data concealed by portions of upper drawn elements of the second layer image data and deleting the concealed portions of the first layer image data, determining with the controller the superimposed portions of lower drawn elements of the second layer image data concealed by portions of upper drawn elements of the first layer image data and deleting the concealed portions of the second layer image data; and outputting with the controller edge information for the each layer image data.

6. The image processing method according to claim 5, further comprising:

creating with the controller intermediate code information that includes basic information expressing a shape of each drawn element;

linking with the controller the basic information to a maximum coordinate value for each drawn element in a sub-scanning direction, the basic information including, for each drawn element, a start point and an end point in a scanning direction;

rendering with the controller each drawn element on a line-by-line basis from the maximum coordinate value in the sub-scanning direction; and performing a compression processing on the edge information.

7. A storage medium readable by a computer, the storage medium storing a program of instructions executable by the computer to perform functions for processing image, the functions comprising:

receiving image data of a document including a plurality of drawn elements, the plurality of drawn elements having portions where upper drawn elements are superimposed over lower drawn elements such that the lower drawn elements have concealed portions;

classifying drawn elements into a respective one of the plurality of element types, the plurality of element types comprising a first element type and a second element type, the first element type and the second element type being different element types, wherein one of the elements types is a character type; and generating a plurality of layer image data that include the drawn elements that have been classified, the plurality of layer image data including a first layer image data and a second layer image data, wherein the first layer image data includes drawn elements of the first element type and the second layer image data includes drawn elements of the second element type;

determining the superimposed portions of lower drawn elements of the first layer image data concealed by portions of upper drawn elements of the second layer image data and deleting the concealed portions of the first layer image data;

determining the superimposed portions of lower drawn elements of the second layer image data concealed by portions of upper drawn elements of the first layer image data and deleting the concealed portions of the second layer image data; and outputting edge information for each layer image data.

8. The storage medium according to claim 7, the functions further comprising:

creating intermediate code information that includes basic information expressing a shape of each drawn element;

linking the basic information to a maximum coordinate value for each drawn element in a sub-scanning direction, the basic information including, for each drawn element, a start point and an end point in a scanning direction;

rendering each drawn element on a line-by-line basis from the maximum coordinate value in the sub-scanning direction; and performing a compression processing on the edge information.

* * * * *